UNITED STATES PATENT OFFICE.

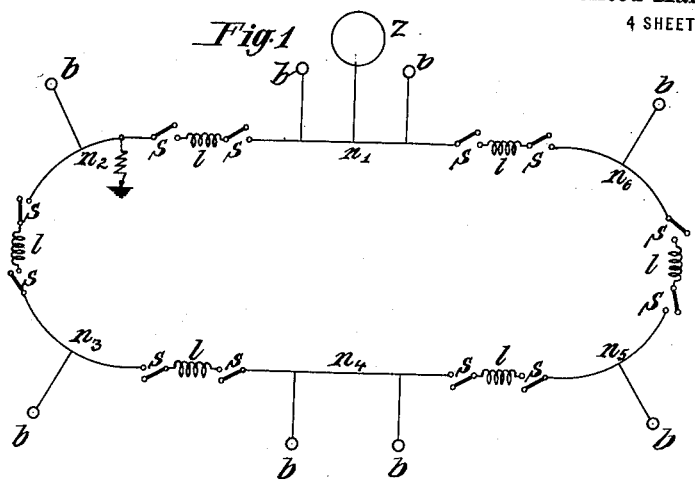
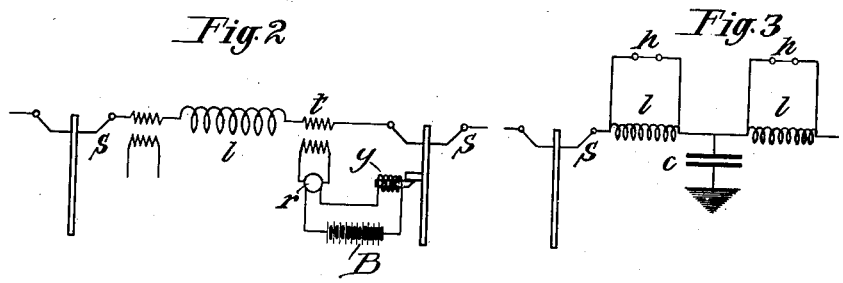
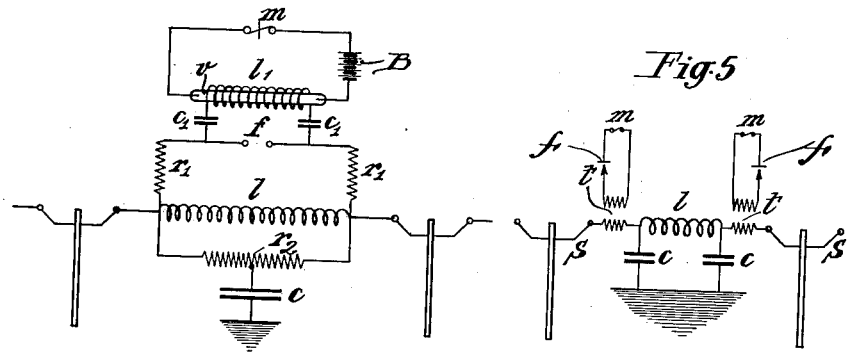

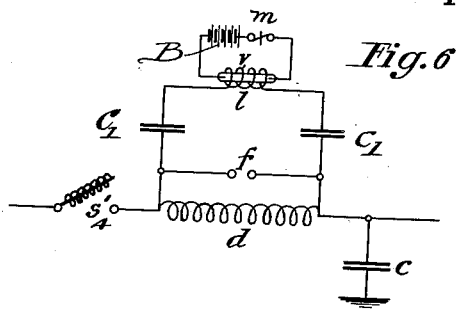
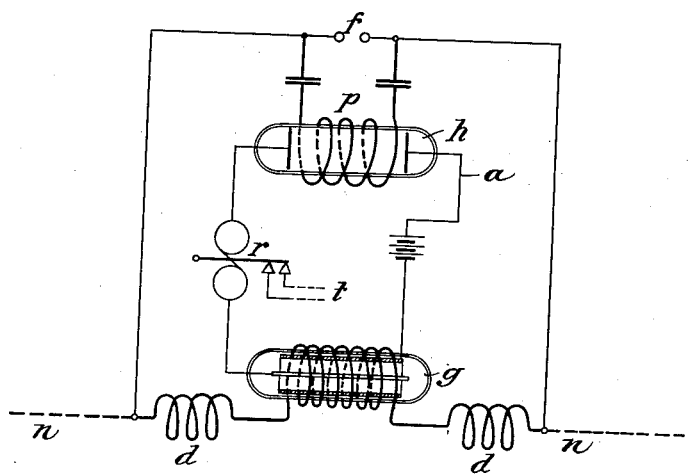
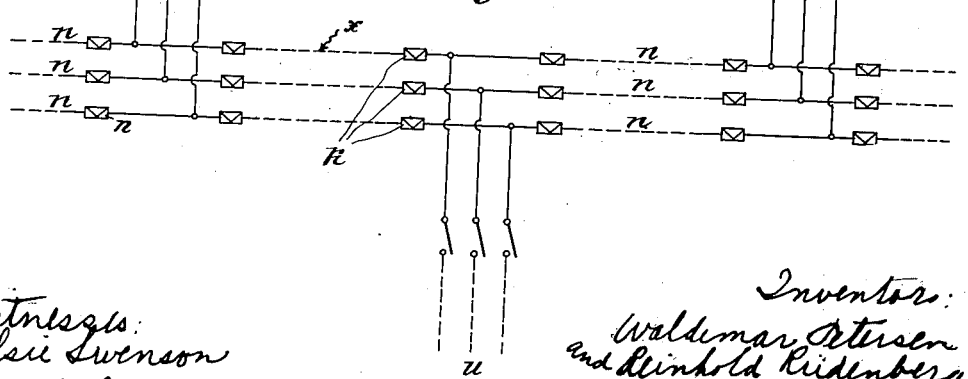

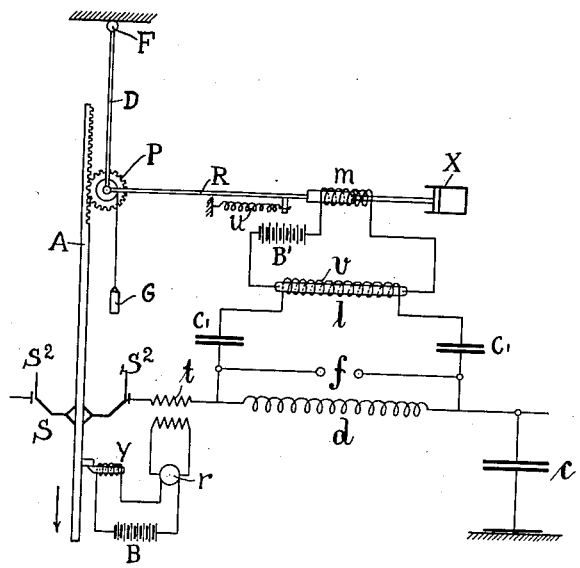
Fig. 6ᵃ

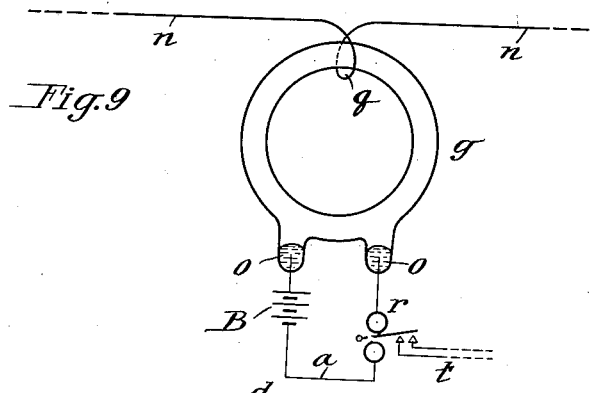
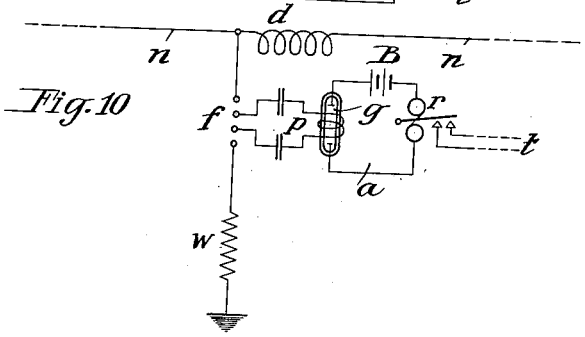
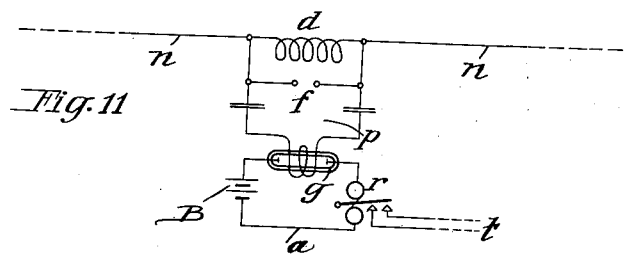
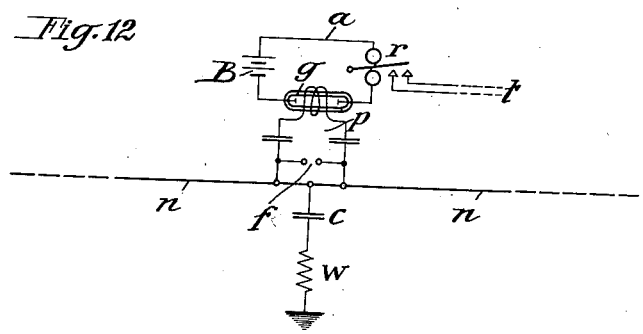

WALDEMAR PETERSEN, OF DARMSTADT, AND REINHOLD RÜDENBERG, OF BERLIN-WESTEND, GERMANY, ASSIGNORS TO SIEMENS-SCHUCKERTWERKE G. M. B. H., OF BERLIN, GERMANY, A CORPORATION OF GERMANY.

SYSTEM FOR PROTECTING ELECTRICAL TRANSMISSION-LINES.

1,335,256.          Specification of Letters Patent.          Patented Mar. 30, 1920.

Application filed November 12, 1914, Serial No. 871,722. Renewed November 24, 1919. Serial No. 340,197.

*To all whom it may concern:*

Be it known that we, WALDEMAR PETERSEN, a German citizen, and residing at Darmstadt, Germany, and REINHOLD RÜDENBERG, a German citizen, and residing in Berlin-Westend, Germany, have invented certain new and useful Improvements in Systems for Protecting Electrical Transmission-Lines, of which the following is a specification.

Many troubles arising in central transmission lines are due to the effect of waves traveling along the line, and which may be set up by any disturbance of the condition of equilibrium, such as for instance atmospheric discharges or a flash-over at the insulators or the like. Such disturbances are likely to be propagated in all directions over the entire installation. While such traveling ways, which usually manifest themselves in a very sudden variation of the voltage and the current, ordinarily do little damage to the lines themselves, they are, when striking electrical machinery or transformers, in most cases the cause of serious trouble which results in releasing of the automatic circuit breakers under phenomena of short-circuit, so that the machinery or apparatus or a part of the same is usually put out of service.

Thus while the cause of the disturbance is located at some point along the transmission line, its detrimental effects are produced at the vital portions of the installation, namely, at the machinery or transformers. Frequently the damaged line is not cut off through response of protective automatic switches until the damage at the machinery has occurred.

According to our invention we propose a method for protecting transmission lines which renders every affected line portion inoperative when such disturbances occur without however permitting the disturbances to damage the machinery and transformers. Our novel arrangement prevents the disturbing waves, which may be generated in the transmission lines by any of the above named causes, from spreading from their point of issue over the entire installation, but permits them to only travel through a certain section of the transmission line when they are stopped and their energy is utilized for cutting off the part of the line in which the disturbance has occurred.

In the accompanying drawings we have illustrated how we propose to reduce our invention to practice. In these drawings:

Figure 1 shows diagrammatically an entire light or power installation.

Fig. 2 shows one form of sectional protecting device.

Fig. 3 shows a sectional protecting device using inductance and capacity.

Fig. 4 shows the combination of a wave absorbing and cut-out protective device.

Fig. 5 shows a protective device sensitive to small disturbances.

Fig. 6 shows a modification of the device shown in Fig. 4.

Fig. 6$^a$ shows a combination of the devices shown in Fig. 2 and 6 and a retarding control.

Fig. 7 shows a form of protective device responding to excesses of voltage and of current.

Fig. 8 shows a circuit diagram indicating in installations the location of the devices such as shown in Fig. 7.

Figs. 9, 10, 11, and 12 show further modifications of rendering a protective device effective.

Referring now to Fig. 1, there is shown diagrammatically as an example an installation provided with our new cut-out devices. From a central station $z$ a large transmission line feeds into a ring circuit from which leads extend to a number of current consumers $b$. The ring circuit is divided into a suitable number of sections, for instance $n_1$—$n_5$, of which each may be separated from the others by end switches $s$. Furthermore the sections are connected with each other over protective devices, for instance, choke coils $l$ for protecting against disturbing waves.

If for instance in the section $n_2$ a disturbing wave is caused to travel by a break-down of an insulator, this wave will propagate from the point of issue in both directions, but on account of the inserted choke coils $l$ it can not pass the ends of the sections but is here reflected or its energy absorbed. Now, as shown in Fig. 2, on each side of coil $l$ a relay $r$ is connected in circuit, for instance, by means of a small transformer $t$. This relay responds in case of a disturbance and closes the circuit containing an operating battery B and the release coils $y$ of the section switch $s$. In this case at each disturbance the two end switches of the disturbed section are opened indirectly by the disturbing wave, so that the damaged section is separated from the unaffected portions of the line and can not transmit the disturbance any further. Also through stopping the disturbing wave by the protective device $l$ and by thus preventing it from passing over to the sound portions of the line to any appreciable extent, no other section switches aside from the two above mentioned will be affected by the traveling wave.

In principle it is immaterial what kind of protective devices are used in order to prevent the passing of disturbing waves from one line section to another, except that such a device must be capable of quickly responding to disturbing waves and must not permit them to pass. For instance, instead of using a self-induction $l$ as shown in Fig. 2, also a condenser may be used for this purpose, which if of sufficient capacity will not permit quick variations of voltage, and therefore is able to serve as a point of reflection. Especially effective are combinations of self-induction and capacity, as shown for instance in Fig. 3. Here an example is shown how the transformers for actuating the releasing relay may be dispensed with and how the potentials occurring at the protective device may themselves be utilized directly to cut off the section.

Two inductances $l$, $l$ are arranged in coils, one for each adjoining section end, and the inner ends of the inductances are grounded through a common condenser $c$ of suitable capacity as mentioned above. A thin wire $h$ is arranged in shunt to each inductance, which wire if its resistance be properly dimensioned transforms almost the entire energy of disturbance into heat. The elongation of this wire, caused by the heat, may then be used to actuate the circuit breakers. The details of cut-out construction of this character are omitted from the drawings as they do not form part of this invention. It is not absolutely necessary to employ on either side of the protective device, a switch for separating the line sections, as shown in Figs. 1 and 2, but frequently as shown in Fig. 3 a switch only on one side will be sufficient so that it may be operated by the disturbing waves arriving from either side.

With the aid of Fig. 3 it has been explained that it may be preferable to use the resistances $h$ for the absorption of the energy of the disturbing waves, the resistance in this case serving simultaneously the purposes of a relay. Both functions, of course, may also be separated, and the sections of the line may be cut from each other by a protective device which through proper combination of self-induction, capacity and resistance absorbs all incoming disturbing waves of sudden character, and a highly sensitive relay may be employed besides for actuating the switches. Fig. 4 shows an arrangement of this kind in which the circuits carrying weak currents for operating the switches and the power circuits for absorbing energy of the electrical surges are separated from each other. The latter circuits comprise a choke coil $l$, a resistance $r_2$ and a ground connection through a condenser $c$, connected as shown, the entire circuit being tuned to the line characteristics. The voltages generated at the choke coil $l$ during the impact of waves are employed for the generation of a spark at the gap $f$, which, however, is quenched by large resistances $r_1$. This spark sets up high frequency oscillations in an oscillating circuit comprising the inductance $l_1$ and the capacities $c_1$, $c_1$. Thereby a vacuum tube $v$, located in the field of inductance $l$ is rendered electrically conductive and closes a circuit comprising a switch relay $m$ and a battery B for actuating the relay.

In order to cause actuation of the circuit breakers already at relatively small disturbances which may for instance appear, if the breakdown of an insulator is just about to occur, it may be preferable to employ an arrangement in which the disturbing waves produce electric oscillations in a circuit comprising self-induction and capacity. Fig. 5 shows an arrangement of this kind in which the primary inductance coil of each of the transformers $t$ forms an oscillating circuit together with the condenser $c$ of the respective side of the device, in which circuit already weak disturbances produce oscillations or surges. In the relay circuit in which the secondary coil of the transformer $t$ is located, an unsymmetrical spark gap $f$ is included which may for instance consist of a point and a plate and which possesses the property of a rectifier, and therefore when acted upon by electrical oscillations imparted to the circuit by transformer $t$, will cause the direct current relay $m$ to respond and thus serve for the release of the switch (releasing device not shown here). Preferably the secondary transformer circuit is tuned to the natural period of the primary circuit.

Instead of a special transformer in all cases also the first windings of the protective choke coils may be used for directly actuating the relay circuit in case rises of voltage having the full break-down voltage occur. It is preferable, however, to couple the relay circuits the same as in Fig. 2 magnetically and inductively with the line circuit, or similarly as in Fig. 4, electrically and inductively by the oscillating circuit $l$ and the vacuum tube $v$, as thereby the passing of the normally high voltage to the relay circuits will be prevented.

Generally speaking the disturbing waves may act upon the cut out switches through any suitable form of relay such for instance, as described before, whereby the waves themselves are prevented by suitable protective devices from entering an adjoining section of the line. Moreover, while thus a portion of the wave energy is needed for actuating the relay device, it is otherwise immaterial for the present purpose, whether the remaining main portion of the energy is entirely absorbed by the protective devices, or whether the waves are only reflected by them, so that by their forced travel back and forth along the disturbed section, their energy is gradually dissipated. In many cases it is possible to so construct the protective apparatus that some of its portions may serve simultaneously for actuating the relay which then results in a particularly simple general arrangement of the construction.

In Fig. 6 we have shown another kind of protective device which may be provided for the sections $n_1$, $n_2$, $n_5$ of a line according to Fig. 1. If in one of the sections, for instance in $n_4$, a short-circuit occurs high frequency waves will travel from the point of short circuit in both directions of the line section, until they strike the switches $s'_4$ and $s''_4$. A suitable relay adapted to control the retarding action of its adjoining switch $S'_4$ (connection with relay not shown here) is operated by a portion of the wave energy similar to the manner described with reference to Fig. 4. In Fig. 6 the choke coil $d$ is provided which is grounded near one of its ends through the condenser $c$. Through the spark discharges at gap $f$, due to the high potential generated at the ends of coil $d$ oscillations are set up in the circuit $f$—$c_1$—$l_1$—$c_1$—$f$, which render the vacuum tube $v$ within coil $l$ conductive to close a local circuit including battery B and relay $m$ so that the latter may operate. By the choke coil $d$ and condenser $c$ the remainder of the energy by reflection and gradual dissipation or by absorption is prevented from passing over to another section. The relay above referred to may be so designed that it diminishes the inherent retarding action of its switch S so that the switch so affected cuts off the damaged line section long before the switches of the other sections, to which some of the disturbing energy may have passed, are able to act and these other circuit breakers may thus remain closed.

Circuit breakers *per se* having variable retardation are well known in the art in many different forms, according to the particular purpose they are to serve. We have therefore refrained from showing in Fig. 6a the detailed construction of a particular type, but by the illustration in that figure we merely wish to indicate diagrammatically the general main functions of such a device in connection with its present purpose of diminishing the normal retardation of the cut-out element, when called for under the conditions outlined above with reference to Figs. 2 and 6.

In Fig. 6a the circuit breaker S is constructed to open the circuit only after having moved through a distance corresponding to the length of its contact elements $S_2$, $S_2$. It is released by the occurrence of an excess current through energizing the release coil $y$ in the battery relay circuit $r$, B', as described with reference to Fig. 2 and shown therein. The opening of the breaker S is ordinarily retarded by a pinion P gearing with the rack bar A of the circuit breaker, the pinion being controlled by a small counter-weight G tending to oppose its rotation in the opening direction of breaker S. The pinion is journaled at the end of a rod D pivoted at a fixed point F. A rod R pivotally connects the center of the pinion to the core of relay $m$. When this relay is energized as described with reference to Fig. 6, its core moves pinion P out of gear with rack bar A, thus freeing circuit breaker S from its drag and allowing it to open the circuit without the normal retardation caused by weight G. Pinion P and rack bar A may be normally held in mesh, for instance through the action of a spring U fastened to rod R at one end and to a fixed point at the other end.

Waves which are partly due to excess voltage which may for instance be caused by weak atmospheric disturbances but which are not sufficient to cause a subsequent short-circuit will equally decrease the retardation of also the neighboring automatic switches. Since these, however, do not carry in that case an unduly high current they will not be actuated in such cases, for instance at their respective release coils $y$.

In order that the increased sensitiveness of the switches for the excess of current which is caused by the voltage waves will not permanently remain and cause the switch to release in case of a perhaps entirely harmless short-circuit due to excess current, preferably arrangements are made which restore the original retardation some time after the dying out of the waves due to excess voltage. This effect may be obtained by any means known in the art, for instance as diagrammatically shown in Fig. 6a by the dash pot X connected to the core of relay $m$, in such fashion that it permits free movement of the core to the right when the relay is energized, but that it retards the return movement to the left against spring U.

The result of auxiliary apparatus of the character just described is that those circuit breakers affected by a relay will respond quicker to an excess of current than the other breakers not affected by a relay, but that after some time those affected are restored to their normal condition of acceleration.

Another feature of our invention consists in employing a circuit closing device which is shown in Figs. 7 and 8. The device shown in Fig. 7 consists of a protective device for protecting electrical lines against excesses of current, such as is well known in ordinary practice and of a further protective device for excess of voltage, so that a system of protection is obtained which protects electrical lines against excess of voltage and more particularly which reacts only to such excesses of voltage which are either caused by a disturbance consuming a considerable amount of energy or which excesses themselves may bring about such disturbances. The circuit $a$ contains two cathode ray tubes $g$ and $h$ which are connected in series with the relay $r$ controlling the release circuit (not completely shown). The relay $r$ can respond only, if the tubes $g$ and $h$ simultaneously permit passage of current. An energy consuming disturbance due to excess of voltage in the line $n$ will cause an increase of the current in its line. This increases the strength of the magnetic field in the tube $g$; this increase of field strength is now employed for increasing the virtual dark cathode space and will therefore ignite the tube $g$. On the other hand the increase of current in the line $n$ will produce an enlarged drop of voltage in the choke coils $d, d$ which is sufficient for bridging the spark gap $f$. By the spark at gap $f$ the oscillating circuit $p$ which is connected in parallel to said spark gap is excited, and effects the ignition of the vacuum tube $h$. By the simultaneous ignition of the tubes $g$ and $h$ circuit $a$ is closed and the relay $r$ in responding causes the closing of release circuit $t$. The particular features of the latter circuit-closing means, involving the cathode ray tube $h$ and its function, form no part of our invention. This device is merely shown here as an example of auxiliary apparatus by which the purpose of our invention may be carried out.

A protective system constructed according to Fig. 7 constitutes an effective limitation of the range of the disturbance caused by excesses of voltage due to transient electrical phenomena in general. A section of the line which should be protected against excess of voltages must therefore be protected at both ends by such a device.

In Fig. 8 we have shown the location of such protective elements $k$ according to Fig. 7 in a three-phase transmission line $n$ for protecting substations against electrical surges which for instance may have their origin between each two substations for instance at point $x$. The substations (not shown) may be connected at $u$ to the mains $n$.

In Fig. 9 another modification of the protective device according to our invention is shown. This modification involves an electro-dynamic principle for generating the high frequency oscillations for the ionization of a gas gap. A secondary electrical field which is generated by the sudden disappearance of magnetism produced by exterior means will immediately ionize a gas gap by which the relay circuit can be closed. In Fig. 9 the line $n$ which is to be protected against the effect of traveling electric waves is led around a vacuum tube $g$ which may be of any desired construction. A circuit $a$ comprising the relay $r$ and a current source $b$ includes also the electrodes $o$—$o$ of the tube $g$. A wave propagated along the line will produce a magnetic disturbance in the portion of the space which is in the immediate vicinity of the loop $q$ of the line, which disturbance causes within the loop $q$—that is in the interior of the vacuum tube $g$—a rapid disappearance of the lines of force. This secondary electrical field ionizes the vacuum of the tube $g$, so that circuit $a$ is closed thereby causing the relay $r$ to respond and to actuate the release circuit $t$ leading to the switching elements (not shown).

Further modified protective systems according to our present invention are shown in Figs. 10, 11 and 12. In these figures the release circuit $t$ comprising the switching elements of the line $n$ (not shown) is closed by the relay $r$ in case the vacuum of the tube $g$ is ionized, so that sufficient current can flow in the circuit $a$. The ionization is accomplished in a well known manner by means of an oscillating circuit $p$ which is energized when the spark gap $f$ is broken down and an arc formed.

The excitation of this oscillating circuit $p$ is thus indirectly effected by the traveling wave. In the line $n$ therefore line elements are inserted which are able to reflect the traveling wave. When a wave meets such reflecting devices it is reflected and its voltage will increase. This rise in the voltage is made use of for breaking down gap $f$ and for exciting the oscillating circuit effecting the ignition of the tube. In Fig. 10 more particularly we have shown a choke coil $d$ as reflecting element in the line. In case of a disturbance the series gap $f$ is broken down by which the oscillating circuit $p$ is excited. This gap is grounded at one side over an energy consuming device $w$, for instance a resistance.

In Fig. 11 the grounding of the gap is avoided by connecting the spark gap $f$ in shunt to the reflecting device $d$, which may again be a choke coil.

Instead of using a self-induction $d$ as reflecting element of course also other suitable elements having reflecting properties may be employed. Thus in Fig. 12 a condenser $c$ is shown as a reflecting element, one plate of which may be grounded over an energy consuming device $w$, for instance a resistance.

We claim:

1. A protective system for an electrical transmission line comprising a plurality of switches subdividing said line into sections, a device responsive to disturbing electric waves inserted at the end of each section, said device being able to impede electrical waves occurring in its line section, and a releasing apparatus operated from said devices, adapted to actuate said switches so as to separate from the line the section in which the disturbance has occurred.

2. A system of protecting electrical transmission lines, comprising a plurality of switches subdividing said line into sections, choke coils inserted into said line sections and condensers connected in parallel therewith, and a releasing apparatus controlled from said choke coils and said condensers adapted to actuate said switches to disconnect a section from said line, in which an electrical disturbance has taken place.

3. A system for protecting an electrical transmission line from electrical wave disturbances, comprising a plurality of switches subdividing said line into sections, choke coils inserted into said line sections and condensers connected in parallel therewith, resistances adapted to absorb the energy of said disturbance, and a relaying apparatus controlled by said choke coils and said condensers adapted to operate said switches to disconnect the section of said line in which a disturbance has occurred.

4. A system for protecting an electrical transmission line from electrical wave disturbances, comprising a plurality of switches subdividing said line into sections, choke coils inserted into said line sections and condensers connected in parallel therewith, resistances connected to absorb the energy of said disturbance, and a relaying apparatus controlled by said choke coils and said condensers and adapted to actuate said switches to disconnect the section of said line affected by a disturbance, said relaying apparatus comprising circuits which are inductively coupled with said line section.

5. In a system for protecting electrical transmission lines the combination of switches for disconnecting a section of said line, said switches being provided with retarding means controlled by a device inserted into said line and responsive to rapid electrical disturbing waves.

6. In a protective system for electrical transmission lines the combination of switches associated with retarding means for disconnecting a section of said line, and devices responsive to rapid electrical disturbing waves occurring therein, said retarding means being controlled by said devices, so as to shorten the time of actuation of said switches in case of electrical disturbances in said line.

7. In a system for protecting electrical transmission lines the combination of switches for disconnecting a section of said line, said switches being provided with retarding means controlled by a device responsive to rapid electrical disturbing waves, said device being inserted into said line, and protective devices inserted between the several sections of said line for preventing the propagation of rapid disturbing waves from said section.

8. In a protective system for electrical transmission lines the combination of switches associated with retarding means for disconnecting a section of said line, and devices responsive to rapid electrical disturbing waves occurring therein, said retarding means being controlled by said devices, so as to shorten the time of actuation of said switches in case of electrical disturbances in said line, and protective devices inserted between the several sections of said line for preventing the propagation of rapid disturbing waves from said section.

In testimony whereof we have set our signatures hereunto in the presence of two subscribing witnesses.

WALDEMAR PETERSEN.
REINHOLD RÜDENBERG.

Witnesses for Petersen:
   JEAN GRUND,
   CARL GRUND.
Witnesses for Rüdenberg:
   WOLDEMAR HAUPT,
   HENRY HASPER.